United States Patent [19]

Rogel

[11] Patent Number: 5,031,351
[45] Date of Patent: Jul. 16, 1991

[54] TWO-PIECE SLIP SINKER FOR FISHING

[76] Inventor: Henry Rogel, 30705 Cannon Rd., Solon, Ohio 44139

[21] Appl. No.: 594,432

[22] Filed: Oct. 9, 1990

[51] Int. Cl.⁵ .............................................. A01K 95/00
[52] U.S. Cl. .................................. 43/44.9; 43/44.95; 43/44.86; 43/44.87; 43/44.93; 43/43.12
[58] Field of Search ................ 43/43.12, 44.86, 44.87, 43/44.89, 44.9, 44.93, 44.95, 44.91

[56] References Cited

U.S. PATENT DOCUMENTS

| 2,655,758 | 10/1953 | Warren | 43/44.9 |
| 2,741,067 | 4/1956 | Cox | 43/44.9 |
| 3,800,459 | 4/1974 | Fleischaker | 43/44.9 |

FOREIGN PATENT DOCUMENTS

| 1016053 | 9/1957 | Fed. Rep. of Germany | 43/44.91 |
| 1259964 | 3/1961 | France | 43/44.95 |

Primary Examiner—Richard K. Seidel
Assistant Examiner—Jeanne M. Elpel
Attorney, Agent, or Firm—Thomas M. Schmitz

[57] ABSTRACT

A two piece slip-sinker for use on fishing lines comprises a two sectional sinker adapted to separate at a linear disposed, axial central opening to receive a fishing line. The two piece slip-sinker is maintained as a unitary sinker by means of an elastomeric O-ring engaging a circumferential periphery channel disposed in the outer surface of the assembled slip-sinker and orientated transverse to the axial through opening. The two piece slip-sinker contains internal engaging means for interlocking the interface surfaces of the two sections and prevent interface movement between the two sections while locked in place by the elastomeric O-ring.

10 Claims, 1 Drawing Sheet

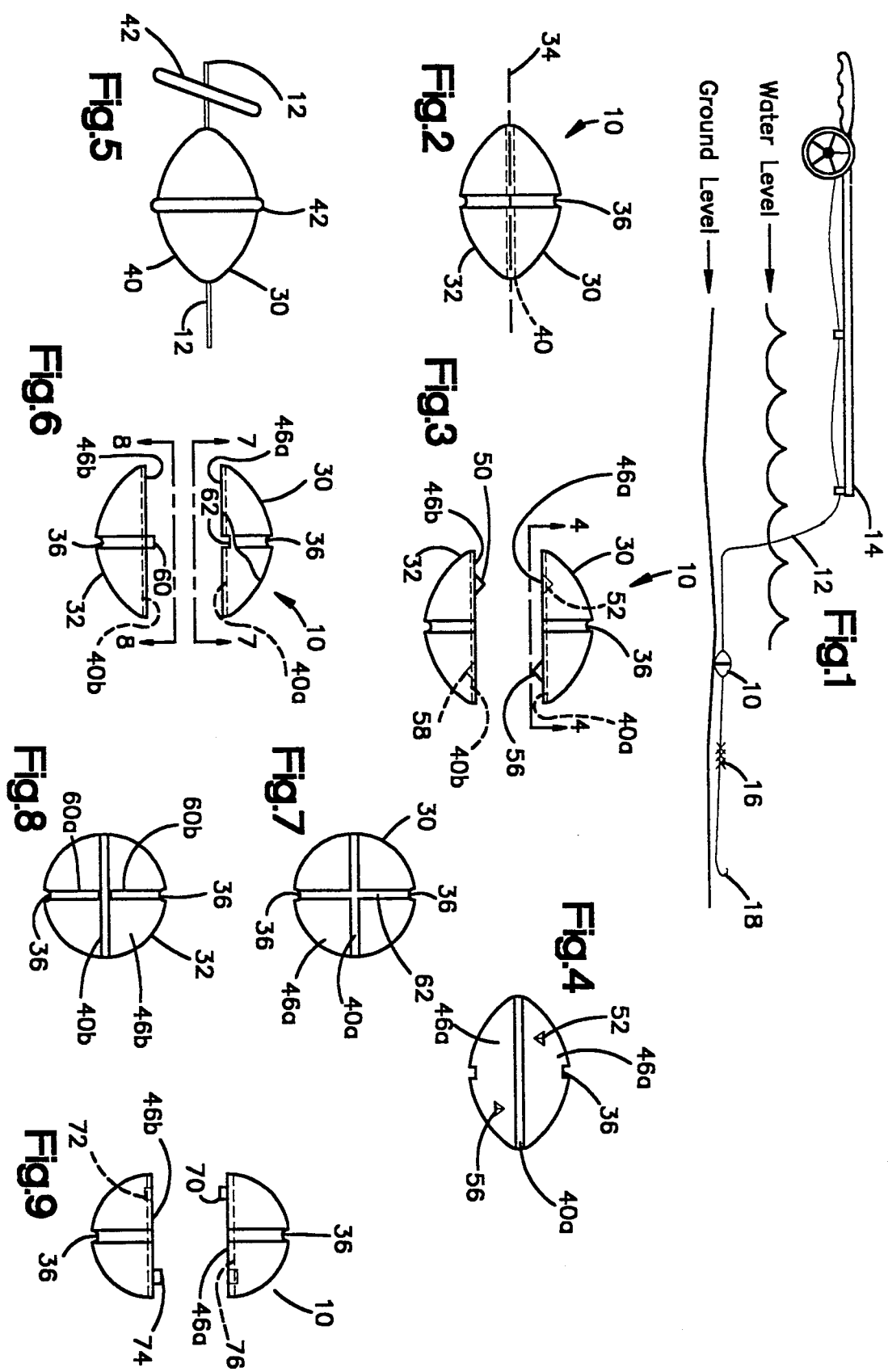

TWO-PIECE SLIP SINKER FOR FISHING

This invention pertains to fishing and slip sinkers for attachment to fishing lines and more particularly to an easily attachable and removable two-piece slip sinker particularly useful in bottom fishing or drift fishing.

BACKGROUND OF THE INVENTION

Bottom fishing pertains to directing the fish hook to the bottom of the water with the idea of maintaining the baited fish hook at or near the bottom where fish tend to feed. The intent is to maintain the fishing line and bait on the water bottom while the bait floats wistfully or in a current. Slip sinkers of various weights from about one-quarter ounce to about five ounces can be used although some slip sinkers up to about eight ounces can be used in ocean waters. It is important to use the lightest sinker and yet one heavy enough to maintain the fishing line on the water bottom. On the other hand, too much weight can cause too much resistance. Fish generally are very sensitive and will quickly drop any bait that offers too much resistance. A too heavy sinker will prevent light strikes from being noticed by the angler and the fish may strip the bait from the hook without the angler knowing that he had a bite. However, a heavier weight may be required to keep the fish line and bait in a current or in deep water while still holding the water bottom. Bottom fishing takes into consideration the water bottom ground to be baited, the depth of the water, the strength of currents and the effect of wave action as well as the type of fish, which in turn dictates the weight of slip sinker desired. A proper slip sinker ordinarily comprises a spherical or egg-shaped or tear-shaped lead weight containing an axial or lengthwise small through opening centrally located for the fishing line to pass through the sinker. Thus, when the fish takes the bait, the fishing line passes easily through the sinker with little or no resistance while the sinker stays on the lake or river bottom. The slip sinker allows the angler to feel the faintest nibble while permitting the fish to swim short distances with the bait but without dragging the sinker along the bottom.

Slip sinkers ordinarily are attached to the fishing line and maintained about one to three feet from the fish hook to permit easy movement of the fish hook. The slip sinker is maintained the distance by a stopper means which can be a fixed tiny weight, a sinker, a swivel, or even a knot in the fishing line. Thus, the fishing line can pass through the slip sinker but the slip sinker will not close in on the fish hook. Prior art slip sinkers comprise a solid one-piece sinker with an axial central hole necessitating threading the sinker each time a new or different slip sinker is operatively attached to the fishing line. To change slip sinkers, the fishing line is either cut or disassembled to remove the old slip sinker whereupon the new slip sinker is slipped onto the cut fishing line followed by reassembly of the fishing line with a fish hook and bait.

It now has been found that a two-piece slip sinker can be produced with can be operatively attached to the fishing line without cutting or disassembly of the fishing line. According to this invention, a two-piece rounded slip sinker comprising two detachable sections such as halves having an axial through opening centrally disposed as a channel or slip adapted to provide passage of the fishing line through the assembled slip sinker. The two halves further include interlocking internal means to prevent interface rotation, slippage, or twisting of one half relative to the other half. The assembled slip sinker contains a continuous peripheral channel indenting the annular surface transverse to the axially disposed, central through opening for receiving the fishing line. The indented peripheral channel is adapted to receive an elastomeric or rubber O-ring adapted to stretch over the peripheral surface of the slip sinker, engage the peripheral channel, and secure the two halves tightly together. The O-ring can be permanently attached to the fishing line by the fishing line passing through the central opening of the O-ring which can be attached or detached from the two-piece slip sinker as desired. To replace the slip-sinker with another, the O-ring can be simply removed and maintained on the fishing line, the two halves can be dismantled, and a new slip sinker assembled and interlocked about the fishing line, whereupon the O-ring remaining on the fishing line can then be stretched over the new slip sinker to engage the transverse peripheral channel and thereby lock the new slip sinker together as a single unit on the fishing line. These and other advantages will become more apparent by referring to the drawings and detailed description of the invention.

BRIEF DESCRIPTION OF THE DRAWINGS

FIG. 1 shows a fishing rod with a line containing the slip sinker of this invention on the water bottom;

FIG. 2 is an enlarged front elevation view of the slip sinker of this invention with the O-ring removed;

FIG. 3 is the slip sinker in FIG. 2 vertically separated to show a top half and a bottom half of the slip sinker;

FIG. 4 is a sectional view taken along lines 4—4 and showing the inside surface of the top half of the slip sinker;

FIG. 5 is an enlarged front view of part of the fishing line in FIG. 1 showing a loose O-ring on the fishing line as well as a fitted O-ring engaging the slip sinker on the fishing line;

FIG. 6 is a front elevation view of an embodiment with a partial section removed and showing top and bottom halves of the slip sinker vertically separated similar to FIG. 3.

FIG. 7 is a sectional view taken along lines 7—7 in FIG. 6 showing the interior surface of the upper section of the slip sinker;

FIG. 8 is a sectional view taken along lines 8—8 in FIG. 6 showing the interior surface of the lower section of the slip sinker;

FIG. 9 is a front elevation of an embodiment similar to FIG. 3 showing a spherical slip sinker vertically separated.

SUMMARY OF THE INVENTION

Briefly, the invention pertains to a two-piece slip sinker for use on a fishing line where the two-piece slip sinker can be separated to attach or remove the sinker from the fishing line. The slip sinker comprises two fitted sections adapted to fit and lock together in use to provide a rounded sinker having an axially directed, center hole for the fishing line to pass loosely through. The outer peripheral surface of the slip sinker contains a peripheral groove disposed transverse to the axial through opening. The peripheral groove is adapted to receive an elastomeric O-ring which stretches over the assembled slip sinker and engages the transverse peripheral channel to maintain the slip sinker as a unit. Thus, the two-piece slip sinker is tightly locked in use and adapted to let the fishing line to slip easily through the unitary slip sinker.

DETAILED DESCRIPTION OF THE INVENTION

Referring now to the drawings where like characters designate like parts, shown generally is a solid metal two-piece slip-sinker 10 of this invention attached to a fishing line 12 operatively attached to fishing rod 14 where the slip-sinker 10 is attached to the fishing line 12 in such a manner as to easily slip along the fishing line as hereinafter described. The fishing line 12 further contains a stopper or a swivel 16 interposed between the slip-sinker 10 and a fish hook 18 attached to the end of the fishing line 12. The slip sinker is solid metal, usually lead, and comprises a two-part construction, preferably two halves, as hereinafter described.

Referring now to FIG. 2, shown is an enlarged front elevation view of the slip-sinker 10 generally egg-shaped or an elongated spherical shape comprising a top half 30 and a bottom half 32 adapted to be separated on axial plane 34 as better shown in FIG. 3. The slip-sinker 10 contains an indented, continuous peripheral groove 36 disposed circumferentially transverse to axis 34 and traversing both the top half 30 and the bottom half 32. The interior of the slip-sinker 10 contains an axial through opening 40 at the axial separation of the top 30 and bottom 32 halves of the slip-sinker 10, where the interior surface of each half 30, 32 contains a matching axial groove 40a and 40b as shown as dotted lines in FIGS. 2 and 3. The indented circumferentially groove 36 disposed in the peripheral surface of the slip-sinker 10 and orientated transverse to the axial through opening 40 is adapted to receive an elastomeric O-ring 42 loosely located on the fishing line 12 to the left as shown in FIG. 5. The elastomeric O-ring 42 is adapted to stretch over the outer peripheral surface of the slip-sinker 10 and tightly engage the peripheral surface groove 36 as again shown in completed assembly of the slip-sinker 10 as shown to the right in FIG. 5.

FIG. 3 is the same view as shown in FIG. 2 but with the upper 30 and lower 32 halves of the slip-sinker 10 separated vertically to better view the interior of the slip-sinker 10. As previously described, matching or mating axial grooves 40a and 40b in the interior surfaces 46a and 46b of the upper 30 and lower 32 halves respectively form the axial through opening 40 axially directed through the elongated center of the slip-sinker 10. FIG. 4 is a sectional view taken along lines 4—4 of the inside surface 46a of the top half 30 of the slip-sinker 10. Further shown in FIGS. 3 and 4 are interior interlocking means comprising an upwardly protruding conical shaped lug 50 attached to or protruding from the lower interior surface 46b and adapted to engage a matching conical hole or indent 52 in the upper interior surface 46a in conjunction with similarly placed but reversed configuration comprising a depending conical lug 56 secured to the upper surface 46a and adapted to engage a matching conical hole or indent 58 disposed in the lower surface 46b. The interlocking means comprising lug 50 and matching indent 52 plus lug 56 and matching indent 58 provide locking engagement of the two halves 30 and 32 to prevent planer slip or relative movement between the halves 30, 32 along the axial plane 34 between the respective interior surfaces 46a and 46b.

Referring now to FIG. 6, shown is a further embodiment of the slip-sinker 10 of this invention comprising upper 30 and lower 32 halves displaced vertically apart but showing a different internal locking means for preventing undesirable slippage between the interior surfaces 46a and 46b. In this embodiment, the internal locking means comprises an elongated diametrically disposed rectangular lug 60 transversing the lower surface 46b and adapted to engage a matching transverse channel 62 disposed in the upper surface 46a. FIG. 7 is a sectional view taken along lines 7—7 in FIG. 6 and showing a view of the interior surface 46a of the upper half 30 of the slip sinker. In this regard, the elongated rectangular channel 62 traverses the upper portion 40a of the axial through opening 40. FIG. 8 is a sectional view taken along lines 8—8 in FIG. 7 showing the interior surface 46b of lower half 32 and particularly the lower portion 40b of the continuous axial through opening 40 transversed by the matching, raised diametric lug 60 where said lug 60 is discontinuous and comprises spaced lugs 60a and 60b diamtrically spaced on either side of the axis or axial through opening 40. Thus, the spaced lugs 60a and 60b permit a continuous axial opening 40 of the slip-sinker 10 to freely slide along the fishing line 12 without interference from the locking means comprising the raised elongated lug 60 engaging the matching channel 62.

Referring now to FIG. 9, shown is a further embodiment comprising a spherical slip-sinker 10 similar in all respects to the elliptical or egg shaped slip-sinker 10 shown in FIGS. 3 and 4 except for the spherical outer shape and the internal locking means comprising a pair of diagonally opposed engagements consisting of a downwardly depending square or rectangular lug 70 adapted to engage a matching indent 72 in the lower surface 46b and an upwardly extended square or rectangularly shaped lug 74 engaging matching indent 76 disposed in the upper surface 46a. It is readily seen that the configuration of the internal locking means is not critical so long as slippage along the axial plane 34 is prevented.

In use, the O-ring 42 is maintained attached to the fishing line 12 at all times as shown to the left in FIG. 5 while the two-piece slip-sinker 10 can be separated readily and replaced by either a smaller or larger slip-sinker 10 as desired. To attach the slip-sinker 10 to the fishing line 12, the two halves 30 and 32 of the slip-sinker 10 are separated and disposed about the fishing line 12 and locked together by engaging the internal locking mechanism. The axial through opening 40 in the slip-sinker provides free movement of the slip-sinker 10 relative to the fishing line 12 passing through the axial opening 40 of the slip-sinker 10. The slip-sinker 10 is further locked by slipping the elastomeric O-ring stretched over the peripheral surface of the slip-sinker 10 to tightly engage the outer circumferential groove 36 and thereby securely locking the two halves 30 and 32 of the slip-sinker 10 together and prevent separating movement of the two halves 30, 32. To replace the slip-sinker 10 with another slip-sinker, the process is merely reversed whereby the old slip-sinker 10 can be easily removed from the fishing line 12 and a new slip-sinker attached thereto in the same manner as the removed old slip-sinker 10 was attached originally.

The foregoing description and illustrative drawings are directed to preferred embodiments but are not intended to be limiting except by the scope of the appended claims.

I claim:

1. A two-piece slip-sinker in combination with a fishing line where the slip-sinker contains an axial through opening for passage of the fishing line to provide free, linear slip movement of the slip-sinker on the fishing line, the slip-sinker comprising:

a two-piece structure comprising two solid metal parts including a top part and bottom part fitted together in use on the fishing line to provide a unitary slip-sinker construction adapted to slip freely on the fishing line, the top and bottom parts adapted to be separated at the axial through opening to provide access for fitting the fishing line linearly within the axial through opening without dismantling the fishing line, the top part and the bottom part having interfacing internal surfaces containing internal locking means disposed transversely to the axial through opening, the locking means engaging the top part internal surface with the bottom part internal surface to prevent interface movement between the internal surfaces of the top part and the bottom part while the two-piece slip-sinker is in use and attached to the fishing line, said slip sinker having a circumferentially peripheral, continuous groove indented in the outer peripheral surface of the slip-sinker, said continuous peripheral groove disposed transversely to the axial through opening of the two-piece slip-sinker, an elastomeric O-ring disposed on the fishing line, where said elastomeric O-ring slips over the two-piece slip-sinker in use and engages the outer peripheral groove to lock the top part to the bottom part and provide a unitary slip-sinker adapted to slip freely on the fishing line.

2. The two-piece slip sinker of claim 1 where the internal locking means for maintaining internal engagement of the top half integral surface with the bottom half internal surface comprises at least two protrusions engaging matching openings where said protrusions are diametrically spaced on either side of said axial through opening.

3. The two-piece slip-sinker of claim 2 where the top and bottom parts comprise a top half and a bottom half respectively separated at an axial plane, and the two protrusions of the internal locking means comprises a first upwardly extending protrusion extending upwardly from the bottom half internal surface and engaging a matching indent in the upper half internal surface and a second downwardly depending protrusion depending downwardly from the upper half internal surface and engaging a matching indent in the lower half internal surface.

4. The two-piece slip-sinker of claim 3 where the upwardly extending protrusion and the downwardly depending protrusion are conical in shape and the matching indents are conical recesses.

5. The two-piece slip-sinker of claim 3 where the upwardly extending protrusion and the downwardly depending protrusion are square in shape.

6. The two-piece slip-sinker of claim 1 where the elastomeric O-ring is made of synthetic rubber.

7. The two-piece slip-sinker of claim 1 where the internal locking means comprises an upwardly extending non-continuous rectangular bar disposed transverse to the axial opening and extending upwardly from the bottom part internal surface and engaging a matching slot disposed in the upper part internal surface, said rectangular bar being non-continuous and providing a space at the axial through opening.

8. The two-piece slip-sinker of claim 1 where the slip sinker is solid metal and comprises an ellipsoidal configuration.

9. The two-piece slip-sinker of claim 1 where the slip-sinker is solid metal and comprises a spherical shape.

10. The two piece slip-sinker of claim 1 comprising a solid metal egg-shaped sinker.

* * * * *